(12) United States Patent
Mori

(10) Patent No.: US 10,967,774 B2
(45) Date of Patent: Apr. 6, 2021

(54) VEHICLE SEAT

(71) Applicant: TOYOTA JIDOSHA KABUSHIKI KAISHA, Toyota (JP)

(72) Inventor: Kazuya Mori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/532,837

(22) Filed: Aug. 6, 2019

(65) Prior Publication Data

US 2020/0108757 A1 Apr. 9, 2020

(30) Foreign Application Priority Data

Oct. 3, 2018 (JP) .............................. JP2018-187948

(51) Int. Cl.
*B60N 2/40* (2006.01)
*B60N 2/888* (2018.01)
(Continued)

(52) U.S. Cl.
CPC ............. *B60N 2/888* (2018.02); *B60N 2/682* (2013.01); *B60N 2/838* (2018.02); *B60N 2/865* (2018.02);
(Continued)

(58) Field of Classification Search
CPC ........ B60N 2/865; B60N 2/868; B60N 2/888; B60N 2/838; B60N 2/682; B60N 2002/899
See application file for complete search history.

(56) References Cited

U.S. PATENT DOCUMENTS 3,528,703 A * 9/1970 Ohta Seizho .......... B60N 2/888
297/391
7,748,779 B2 * 7/2010 Zimmerman .......... B60N 2/688
297/216.13
(Continued)

FOREIGN PATENT DOCUMENTS

JP H10-119616 A 5/1998
JP 2007-091175 A 4/2007
(Continued)

OTHER PUBLICATIONS

U.S. Appl. No. 16/525,694, filed Jul. 30, 2019 in the name of Mori et al.

*Primary Examiner* — Syed A Islam
(74) *Attorney, Agent, or Firm* — Oliff PLC

(57) ABSTRACT

There is provided a vehicle seat including: a seatback frame of a seatback that supports a back area of a vehicle occupant, the seatback frame including: a left and right pair of side frame portions spaced apart in a seat width direction; and an upper frame portion that joins between end portions, at a seat upper side, of the left and right pair of side frame portions in the seat width direction, a headrest that supports a head area of the vehicle occupant being supported at the upper frame portion; and a plastic deformation portion provided at the upper frame portion, the plastic deformation portion being plastically deformed and moving at least a portion of the upper frame portion toward a seat rear side together with the headrest, when a load toward the seat rear side that exceeds a predetermined value is applied to the plastic deformation portion.

8 Claims, 3 Drawing Sheets

(51) Int. Cl.
  *B60N 2/68*   (2006.01)
  *B60N 2/80*   (2018.01)
  *B60N 2/838*  (2018.01)
  *B60N 2/865*  (2018.01)
  *B60N 2/868*  (2018.01)

(52) U.S. Cl.
  CPC ........ *B60N 2/868* (2018.02); *B60N 2002/899* (2018.02)

(56) References Cited

U.S. PATENT DOCUMENTS

| | | | |
|---|---|---|---|
| 8,714,641 B2 * | 5/2014 | Cyoukyu | B60N 2/68 297/216.13 |
| 2012/0001462 A1 | 1/2012 | Cyoukyu et al. | |

FOREIGN PATENT DOCUMENTS

| | | |
|---|---|---|
| JP | 2009-137485 A | 6/2009 |
| JP | 2012-011827 A | 1/2012 |

* cited by examiner

VEHICLE SEAT

CROSS-REFERENCE TO RELATED APPLICATION

This application is based on and claims priority under 35 USC 119 from Japanese Patent Application No. 2018-187948 filed on Oct. 3, 2018, the disclosure of which is incorporated by reference herein.

BACKGROUND

Technical Field

The present disclosure relates to a seat for a vehicle.

Related Art

Japanese Patent Application Laid-Open (JP-A) No. 2007-091175 discloses a seatback of a vehicle seat that suppresses rearward movement toward a seat rear side by a vehicle occupant sitting on the vehicle seat during a rear collision of the vehicle. The seatback recited in JP-A No. 2007-091175 is provided with a collision absorption portion in a region at the upper side of a seatback frame of the seatback. During a rear collision of the vehicle, a load from the shoulders of the vehicle occupant is applied to the collision absorption portion and the collision absorption portion deforms while bracing the shoulders of the vehicle occupant. Therefore, rearward movement of the upper body of the seat occupant may be arrested and an impact on the upper body of the vehicle occupant may be moderated.

When a vehicle equipped with a vehicle seat facing toward the rear side of the vehicle is subject to a front collision or a vehicle equipped with a vehicle seat facing toward the front side of the vehicle is subject to a high-speed rear collision, an impact on a vehicle occupant sitting on the vehicle seat is likely to be increased further. It is difficult to moderate the impact on the vehicle occupant in these cases with the technology recited in JP-A No. 2007-091175.

SUMMARY

In consideration of the circumstances described above, the present disclosure provides a vehicle seat that may moderate an impact on a vehicle occupant sitting on the vehicle seat when a vehicle that is equipped with the vehicle seat facing toward the rear side of the vehicle is subject to a front collision or a vehicle that is equipped with the vehicle seat facing toward the front side of the vehicle is subject to a high-speed rear collision.

A vehicle seat according to a first aspect of the present disclosure includes: a seatback frame that structures a framework of a seatback that supports the back area of a vehicle occupant, the seatback frame including a left and right pair of side frame portions that are disposed to be spaced apart in a seat width direction, and an upper frame portion that joins (spans) between end portions at a seat upper side of the left and right pair of side frame portions in the seat width direction, a headrest that supports the head area of the vehicle occupant being supported at the upper frame portion; and a plastic deformation portion provided at the upper frame portion, the plastic deformation portion being plastically deformed and moving at least a portion of the upper frame portion toward the seat rear side together with the headrest when a load toward the seat rear side that exceeds a predetermined value is applied to the plastic deformation portion.

According to the vehicle seat of the first aspect of the present disclosure, when the vehicle is subject to a front collision in a state in which the vehicle seat is facing toward the rear side of the vehicle, the back area of a vehicle occupant sitting on the vehicle seat presses the seatback toward the seat rear side. Thus, a load toward the seat rear side from the back area of the seat occupant is applied to the upper frame portion of the seatback frame. If the load toward the seat rear side that is applied to the upper frame portion of the seatback frame from the back area of the vehicle occupant exceeds the predetermined value, the plastic deformation portion of the upper frame portion is plastically deformed. Consequently, at least a portion of the upper frame portion is moved toward the seat rear side together with the headrest, and an impact on the vehicle occupant sitting on the vehicle seat is moderated. Similarly, when the vehicle is subject to a high-speed rear collision in a state in which the vehicle seat is facing toward the front side of the vehicle, the plastic deformation portion of the upper frame portion is plastically deformed and at least a portion of the upper frame portion is moved toward the seat rear side together with the headrest, as a result of which an impact on the vehicle occupant sitting on the vehicle seat is moderated.

In a vehicle seat according to a second aspect of the present disclosure, in the vehicle seat according to the first aspect, the plastic deformation portion includes a stress concentration portion that is formed at the upper frame portion and is inflected in the seat front-and-rear direction.

According to the vehicle seat of the second aspect of the present disclosure, when the vehicle is subject to a front collision in a state in which the vehicle seat is facing toward the rear side of the vehicle and when the vehicle is subject to a high-speed rear collision in a state in which the vehicle seat is facing toward the front side of the vehicle, stress is concentrated at the stress concentration portion of the upper frame portion, and the stress concentration portion is plastically deformed. Consequently, at least a portion of the upper frame portion is moved toward the seat rear side together with the headrest, and an impact on the vehicle occupant sitting on the vehicle seat is moderated.

In a vehicle seat according to a third aspect of the present disclosure, in the vehicle seat according to the first aspect or the second aspect, seen from the seat upper side, at least a portion of the plastic deformation portion is disposed between the left and right pair of side frame portions.

According to the vehicle seat of the third aspect of the present disclosure, because at least a portion of the plastic deformation portion is disposed between the left and right pair of side frame portions, an increase in a thickness dimension of the seatback in the seat front-and-rear direction may be suppressed.

In a vehicle seat according to a fourth aspect of the present disclosure, in the vehicle seat according to the second aspect or the third aspect, the upper frame portion is formed in a plate shape that extends in the seat width direction, a face of which faces to the seat front side, and the stress concentration portion is formed continuously from an end at the seat upper side of the upper frame portion to an end at the seat lower side of the upper frame portion.

According to the vehicle seat of the fourth aspect of the present disclosure, the stress concentration portion, which is a portion that is inflected in the seat front-and-rear direction, is formed continuously from the end at the seat upper side of the upper frame portion to the end at the seat lower side of the upper frame portion. Therefore, bending stiffness in the seat front-and-rear direction of the upper frame portion that is formed in a plate shape may be improved.

In a vehicle seat according to a fifth aspect of the present disclosure, in the vehicle seat according to any one of the first to fourth aspects, a headrest support portion at which the headrest is supported is fixed to the upper frame portion; and the plastic deformation portion is provided at both sides in the left-and-right direction of a region of the upper frame portion at which the headrest support portion is fixed.

According to the vehicle seat of the fifth aspect of the present disclosure, the stiffness of the region of the upper frame portion at which the headrest support portion is fixed is improved by the headrest support portion. The plastic deformation portion is provided at both sides in the left-and-right direction of the region of the upper frame portion whose stiffness is improved by the headrest support portion. Therefore, when the plastic deformation portion is being plastically deformed, the region of the upper frame portion at which the headrest support portion is fixed may be moved toward the seat rear side more consistently.

The vehicle seat according to the present disclosure provides an excellent effect in that that an impact on a vehicle occupant sitting on the vehicle seat may be moderated when a vehicle that is equipped with the vehicle seat facing toward the rear side of the vehicle is subject to a front collision or a vehicle that is equipped with the vehicle seat facing toward the front side of the vehicle is subject to a high-speed rear collision.

BRIEF DESCRIPTION OF THE DRAWINGS

Exemplary embodiments of the present disclosure will be described in detail based on the following figures, wherein:

FIG. 2 is a side view showing a seatback frame and the like; and

DETAILED DESCRIPTION

Figure 1:
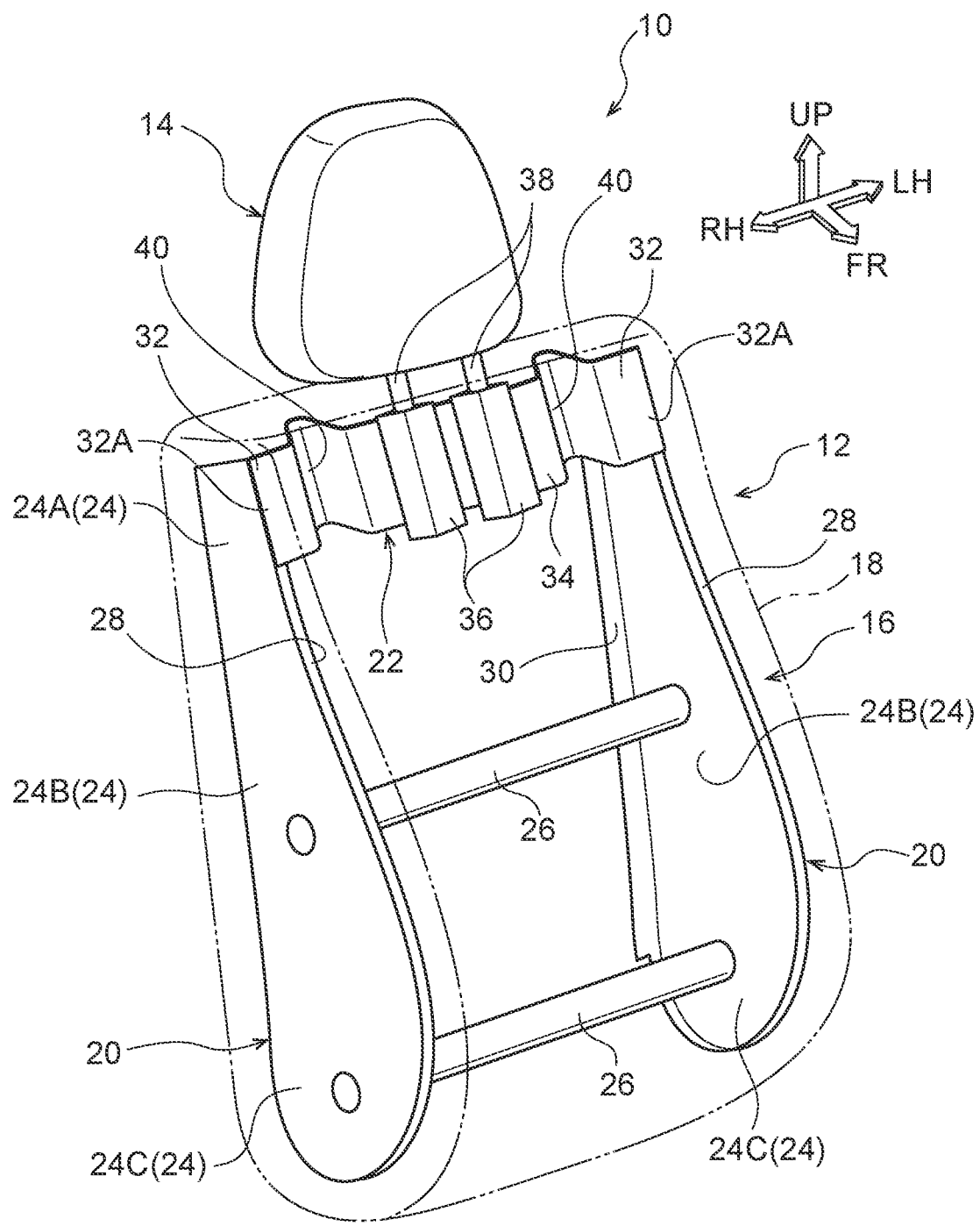
FIG. 1 is a perspective view showing a seatback and the like of a vehicle seat according to a present exemplary embodiment.

A vehicle seat 10 according to an exemplary embodiment of the present disclosure is described below using FIG. 1 to FIG. 3. In the descriptions below, where descriptions are given referring to the front, rear, left, right, upper and lower directions, unless otherwise specified, these represent the front, rear, left, right, upper and lower directions as seen by a vehicle occupant sitting on the vehicle seat 10. The arrow FR that is shown where appropriate in the drawings indicates the seat front direction, the arrow UP indicates the seat upper direction, the arrow RH indicates the seat right direction, and the arrow LH indicates the seat left direction. The left and right directions match a seat width direction.

As shown in FIG. 1, the vehicle seat 10 according to the present exemplary embodiment is provided with a seat cushion, which is not shown in the drawings, a seatback 12, and a headrest 14. The seat cushion supports the buttock area of a vehicle occupant (a seat occupant). The seatback 12 is attached to a rear end portion of the seat cushion and supports the back area of the vehicle occupant. The headrest 14 is attached to an upper end portion of the seatback 12 and supports the head area of the vehicle occupant.

The vehicle seat 10 according to the present exemplary embodiment is provided in the cabin of an autonomous driving vehicle. Accordingly, the vehicle seat 10 can be fixed in a state in which the seat front side of the vehicle seat 10 faces toward the rear side of the vehicle. The seat front side of the vehicle seat 10 may be caused to face toward the front side of the vehicle by the vehicle seat 10 being turned.

The seatback 12 is structured by a seatback pad 18 being attached to a seatback frame 16. The seatback frame 16 constitutes a framework of the seatback 12. The seatback pad 18 is covered with a cover material.

Figure 2:
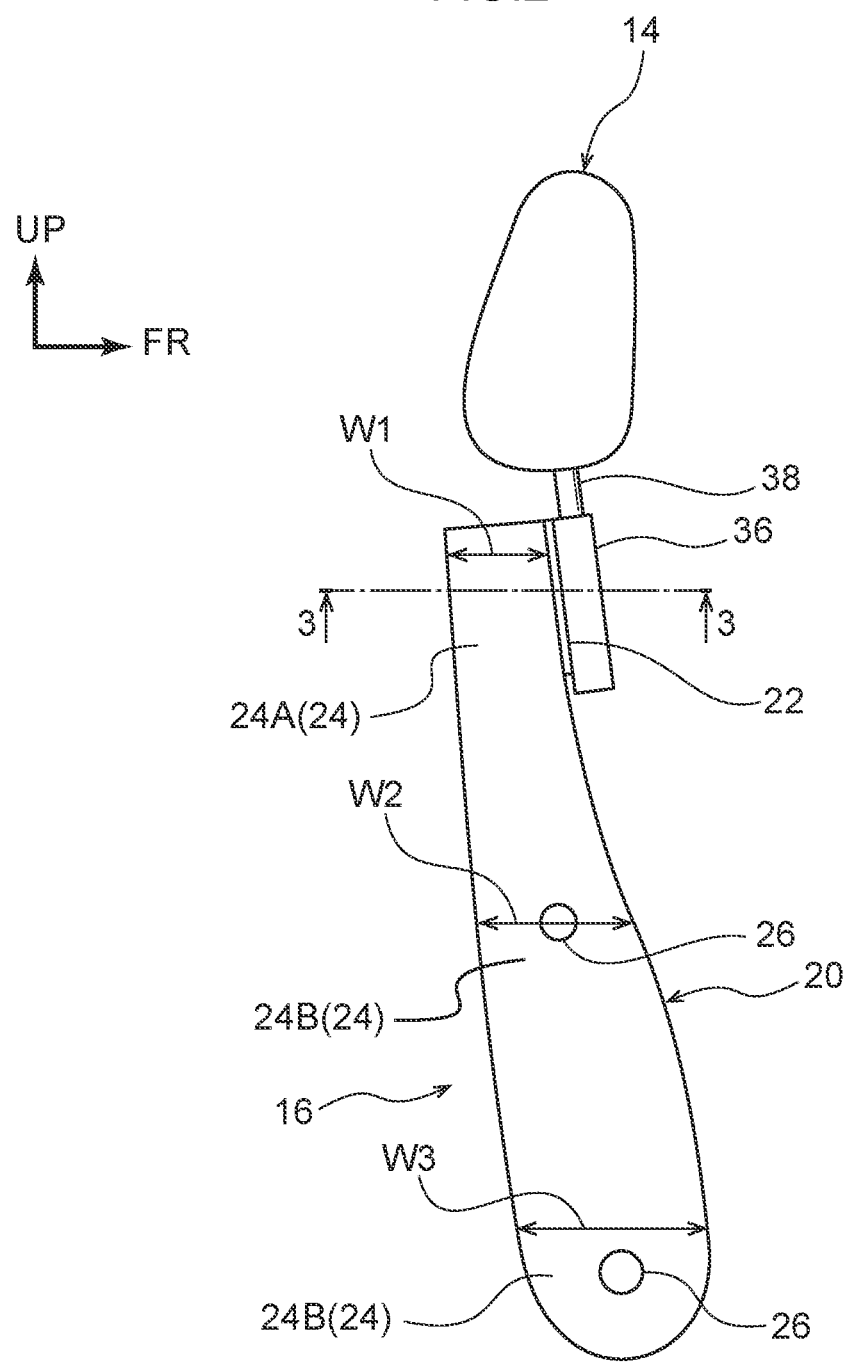

As shown in FIG. 1 and FIG. 2, the seatback frame 16 is provided with a left and right pair of side frame portions 20 and an upper frame portion 22. The side frame portions 20 are disposed to be spaced apart in the seat width direction. The upper frame portion 22 joins (spans) between end portions at the seat upper side of the side frame portions 20 in the seat width direction.

The side frame portion 20 disposed at the left side and the side frame portion 20 disposed at the right side are formed to be symmetrical in the seat width direction. The side frame portions 20 are formed by applying press-machining or the like to steel plate.

The side frame portions 20 are provided with side wall portions 24 that extend in the vertical direction with thickness directions thereof in the seat width direction. A width dimension W1 in the seat front-and-rear direction of a seat upper side region 24A of each side wall portion 24 is smaller than a width dimension W3 in the seat front-and-rear direction of a seat lower side region 24C of the side wall portion 24. A width dimension W2 in the seat front-and-rear direction of a seat vertical direction middle region 24B of the side wall portion 24 progressively decreases toward the upper side.

The seat vertical direction middle regions 24B of the side wall portions 24 of the left and right side frame portions 20 are joined via a connecting rod 26 formed in a circular tube shape. The seat lower side regions 24C of the side wall portions 24 of the left and right side frame portions 20 are joined via another of the connecting rod 26.

Figure 3:
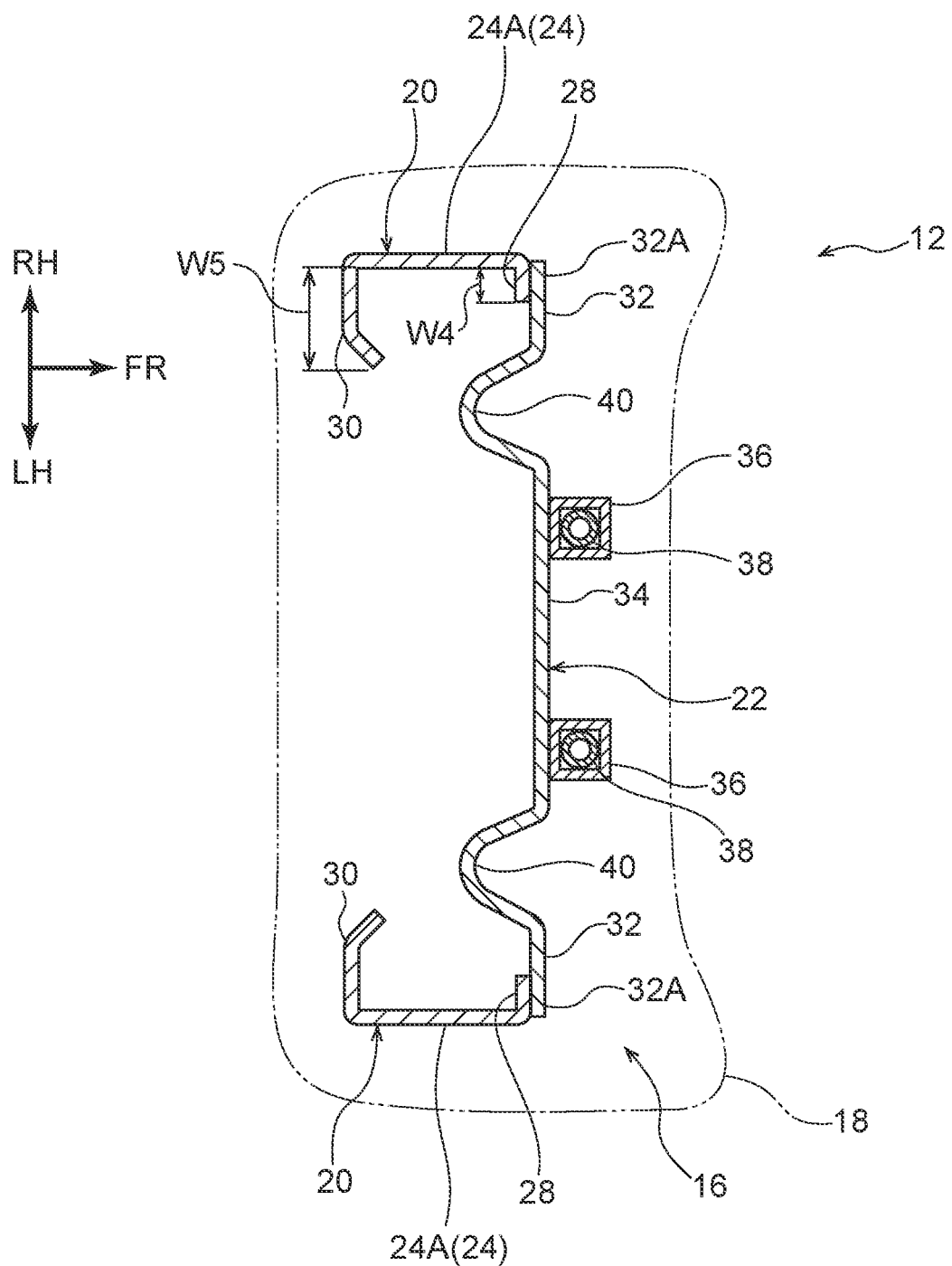
FIG. 3 is a magnified sectional view showing the seatback frame and the like in a section cut along line 3-3 in FIG. 2.

As shown in FIG. 2 and FIG. 3, each side frame portion 20 is provided with a front side flange portion 28, which extends toward the seat width direction inner side from a front edge of the side wall portion 24, and a rear side flange portion 30, which extends toward the seat width direction inner side from a rear edge of the side wall portion 24. A width dimension W4 of the front side flange portion 28 in the seat width direction is specified to be smaller than a width dimension W5 of the rear side flange portion 30 in the seat width direction.

Similarly to the side frame portions 20, the upper frame portion 22 is formed by applying press-machining or the like to steel plate that is a plate-shaped member. The upper frame portion 22 is formed in a rectangular shape, a front face of which faces to the seat front side and a long direction of which, seen from the seat front side, is in the left-and-right direction.

Two seat width direction side regions of the upper frame portion 22 are formed as end-portion-side face portions 32 that extend in the seat width direction and the vertical direction. A seat width direction outer side region 32A of the end-portion-side face portion 32 at the left side is joined by welding to the front face of an upper end portion of the front side flange portion 28 of the side frame portion 20 at the left side, and a seat width direction outer side region 32A of the end-portion-side face portion 32 at the right side is joined by welding to the front face of an upper end portion of the front side flange portion 28 of the side frame portion 20 at the right side. Thus, the upper frame portion 22 is fixed to the left and right side frame portions 20.

A seat width direction middle region of the upper frame portion 22 is formed as a central face portion 34 that extends in the seat width direction and the vertical direction. A pair of headrest support portions 36 formed in tubular shapes are joined by welding to a front face of the central face portion 34 in a state in which the headrest support portions 36 are disposed to be spaced apart in the seat width direction. In the present exemplary embodiment as seen in a seat side view, the pair of headrest support portions 36 are disposed at the seat front side relative to regions (the front side flange portions 28) at the seat upper side of the left and right side frame portions 20. Headrest stays 38, which structure portions of the headrest 14, are inserted into the pair of headrest support portions 36. Thus, the headrest 14 is supported at the upper frame portion 22.

Two seat width direction side regions of the central face portion 34 of the upper frame portion 22, which is to say, a region of the upper frame portion 22 between the central face portion 34 and the end-portion-side face portion 32 at the left side and a region of the upper frame portion 22 between the central face portion 34 and the end-portion-side face portion 32 at the right side, are formed as inflected portions 40. The inflected portions 40 serve as plastic deformation portions and stress concentration portions that, seen from the seat upper side, protrude toward the seat rear side and are inflected in substantial "V" shapes ("U" shapes) of which the seat front sides are opened up. In the present exemplary embodiment, each inflected portion 40 is formed continuously from the seat upper side end of the upper frame portion 22 to the seat lower side end of the upper frame portion 22. Seen from the seat upper side, substantially the whole of the inflected portions 40 are disposed between the left and right pair of side frame portions 20.

When a load toward the seat rear side is applied to the central face portion 34 of the upper frame portion 22, stress is concentrated at the inflected portions 40. If the load toward the seat rear side that is applied to the central face portion 34 of the upper frame portion 22 exceeds a predetermined value, the upper frame portion 22 is plastically deformed starting from the inflected portions 40. When the upper frame portion 22 is plastically deformed starting from the inflected portions 40, the inflected portions 40 act as excess portions and are stretched in the seat front-and-rear direction, and the central face portion 34 of the upper frame portion 22 acts to move toward the seat rear side.

Operation and Effects of the Present Exemplary Embodiment

Now, operation and effects of the present exemplary embodiment are described.

According to the vehicle seat 10 of the present exemplary embodiment described above, when the vehicle is subject to a front collision in a state in which the vehicle seat 10 is facing toward the rear side of the vehicle, the back area of a vehicle occupant sitting on the vehicle seat 10 presses the seatback 12 toward the seat rear side. Thus, a load toward the seat rear side is applied to the central face portion 34 of the upper frame portion 22 of the seatback frame 16 from the back area of the vehicle occupant.

If the load toward the seat rear side that is applied to the central face portion 34 of the upper frame portion 22 from the back area of the vehicle occupant exceeds the predetermined value, the upper frame portion 22 is plastically deformed starting from the inflected portions 40. When the upper frame portion 22 is plastically deformed starting from the inflected portions 40, the inflected portions 40 act as excess portions and are stretched in the seat front-and-rear direction. Thus, the central face portion 34 of the upper frame portion 22 moves toward the seat rear side together with the headrest 14. Therefore, movement of the back area of the vehicle occupant toward the seat rear side is allowed while kinetic energy of the back area of the vehicle occupant is absorbed by the deformation of the inflected portion 40. Thus, an impact against the vehicle occupant sitting on the vehicle seat 10 is moderated.

Similarly, when the vehicle is subject to a high-speed rear collision in a state in which the vehicle seat 10 is facing toward the front side of the vehicle (when the vehicle is shunted by a vehicle running at high speed), the upper frame portion 22 is plastically deformed starting from the inflected portions 40, and the central face portion 34 of the upper frame portion 22 moves toward the seat rear side together with the headrest 14. Thus, an impact against a vehicle occupant sitting on the vehicle seat 10 is moderated.

In the present exemplary embodiment as seen from the seat upper side, substantially the whole of the inflected portions 40 formed at the upper frame portion 22 are disposed between the left and right pair of side frame portions 20. Therefore, an increase in a thickness dimension of the seatback 12 in the seat front-and-rear direction may be suppressed.

In the present exemplary embodiment, the inflected portions 40 formed in the upper frame portion 22 are formed continuously from the seat upper side end of the upper frame portion 22 to the lower side end of the upper frame portion 22. Therefore, a bending stiffness in the seat front-and-rear direction of the upper frame portion 22 that is formed in a plate shape may be improved.

In the present exemplary embodiment, the stiffness of the central face portion 34 that is the region of the upper frame portion 22 at which the headrest support portions 36 are fixed is improved by the headrest support portions 36. Because the inflected portions 40 are provided at the two left-and-right direction sides of this region (the central face portion 34) of the upper frame portion 22 whose stiffness is improved by the headrest support portions 36, the central face portion 34 of the upper frame portion 22 may be moved toward the seat rear side more consistently when the inflected portions 40 are being plastically deformed.

In the present exemplary embodiment, an example is described in which the headrest support portions 36 are joined to the upper frame portion 22, but the present disclosure is not limited thus. For example, the headrest 14 (the headrest stays 38) may be directly joined to the upper frame portion 22.

In the present exemplary embodiment, an example is described in which the inflected portions 40 are formed in the upper frame portion 22 and the inflected portions 40 serve as start points for deformation, but the present disclosure is not limited thus. For example, reduced-thickness cavities may be formed in the upper frame portion 22, and peripheral edge portions of these reduced-thickness cavities may serve as start points for deformation (i.e., the plastic deformation portions).

In the present exemplary embodiment, an example is described in which substantially the whole of the inflected portions 40 formed in the upper frame portion 22 are disposed between the left and right pair of side frame portions 20, but the present disclosure is not limited thus. For example, the whole of the inflected portions 40 may be disposed between the left and right pair of side frame portions 20. Further, structures are possible in which the inflected portions 40 are not disposed between the left and right pair of side frame portions 20. Whether or not the inflected portions 40 are disposed between the left and right pair of side frame portions 20 may be specified as appropriate in consideration of shapes, dimensions and the like of the seatback pad 18.

In the present exemplary embodiment, an example is described in which the upper frame portion 22 is formed of a plate-shaped member (a steel plate), but the present disclosure is not limited thus. For example, the upper frame portion may be formed using circular tube-shaped members such as steel pipes or the like.

An exemplary embodiment of the present disclosure is described hereabove. However, the present disclosure is not limited by these descriptions and it will be clear that numerous modifications beyond these descriptions may be embodied within a technical scope not departing from the spirit of the disclosure.

What is claimed is:

1. A vehicle seat comprising:
   (i) a seatback frame that structures a framework of a seatback that supports a back area of a vehicle occupant, the seatback frame including:
      (i)(a) a left and right pair of side frame portions that are spaced apart in a seat width direction; and
      (i)(b) an upper frame portion that extends between and is joined to end portions, at a seat upper side, of the left and right pair of side frame portions in the seat width, direction; and
   (ii) a headrest that supports a head area of the vehicle occupant, the headrest supported by the upper frame portion of the seatback frame, wherein
   the upper frame portion includes a plastic deformation portion that plastically deforms and moves at least a portion of the upper frame portion that extends between the left and right pair of side frame portions toward a seat rear side together with the headrest that is supported by the upper frame portion, when a load toward the seat rear side that exceeds a predetermined value is applied to the plastic deformation portion.

2. The vehicle seat according to claim 1, wherein the plastic deformation portion includes a stress concentration portion that is formed at the upper frame portion and is inflected in a seat front-and-rear direction.

3. The vehicle seat according to claim 1, wherein, when viewed from the seat upper side, at least a portion of the plastic deformation portion is disposed between the left and right pair of side frame portions.

4. The vehicle seat according to claim 2, wherein:
   the upper frame portion is formed in a plate shape that extends in the seat width direction, a face of which faces a seat front side; and
   the stress concentration portion is formed continuously from an end at the seat upper side of the upper frame portion to an end at a seat lower side of the upper frame portion.

5. The vehicle seat according to claim 1, wherein:
   a headrest support portion, at which the headrest is supported, is fixed to the upper frame portion; and
   the plastic deformation portion is provided at both sides in a left-and-right direction of a region of the upper frame portion at which the headrest support portion is fixed.

6. The vehicle seat according to claim 2, wherein the plastic deformation portion includes an inflected portion that, when viewed from the seat upper side, is inflected so as to protrude toward the seat rear side and such that a seat front side thereof is opened up.

7. The vehicle seat according to claim 6, wherein the inflected portion is inflected substantially in a "V" shape.

8. The vehicle seat according to claim 6, wherein the inflected portion is inflected substantially in a "U" shape.

* * * * *